Feb. 28, 1928.
J. F. O'CONNOR
1,660,572
FRICTION SHOCK ABSORBING MECHANISM
Filed May 2, 1925    2 Sheets-Sheet 1
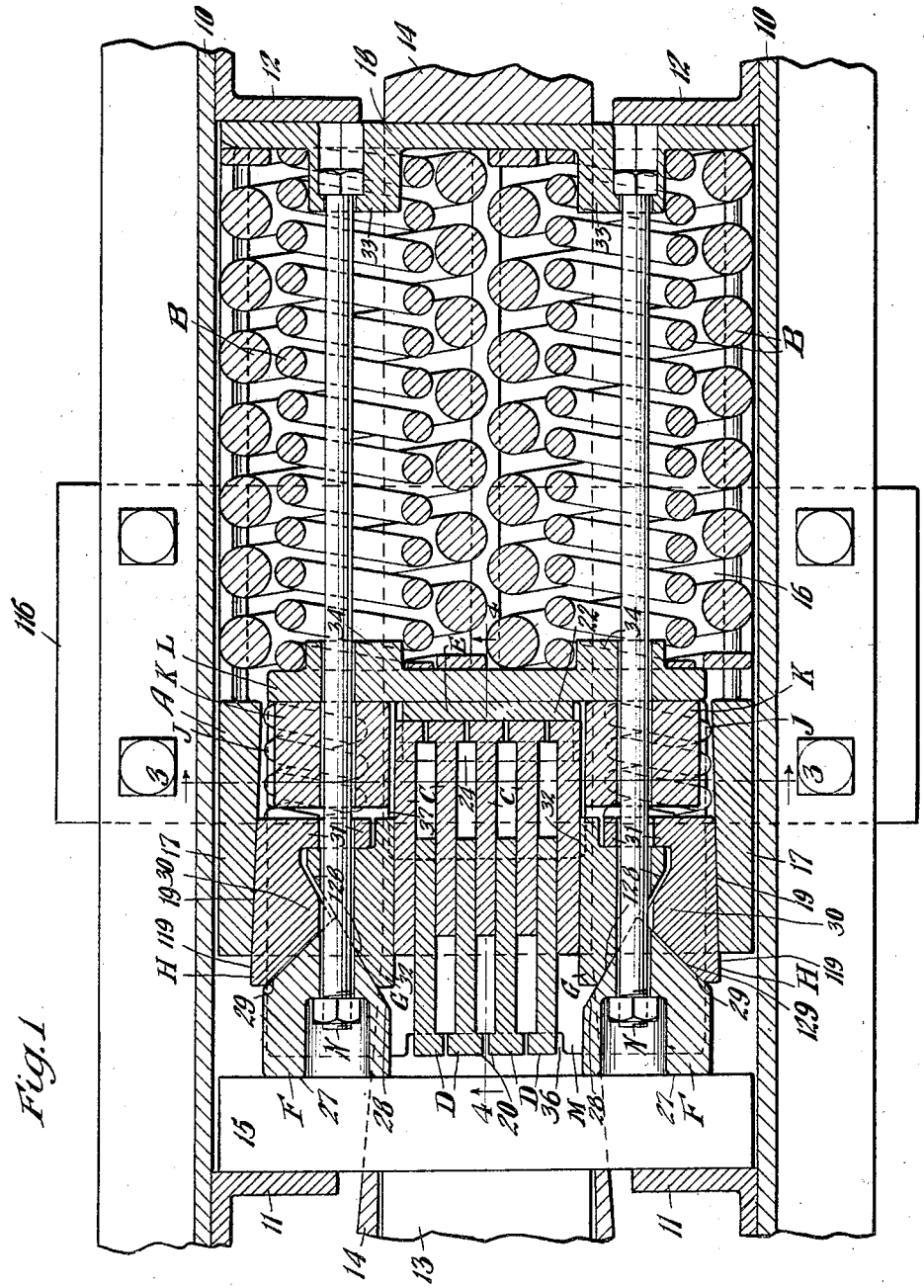
Witness
Wm. Geiger
Inventor
John F. O'Connor
By George I. Haight
His Atty.

Feb. 28, 1928.
J. F. O'CONNOR
1,660,572
FRICTION SHOCK ABSORBING MECHANISM
Filed May 2, 1925  2 Sheets-Sheet 2
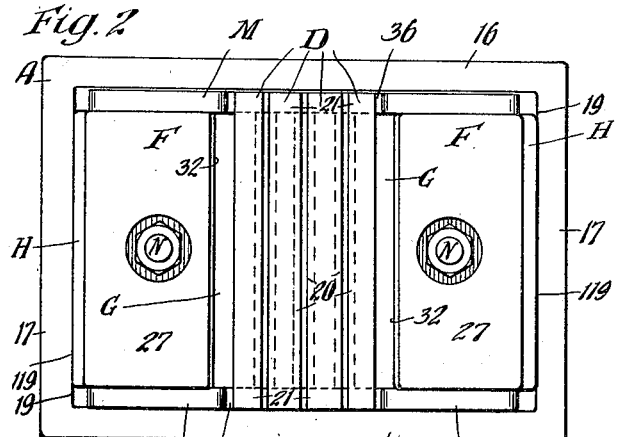
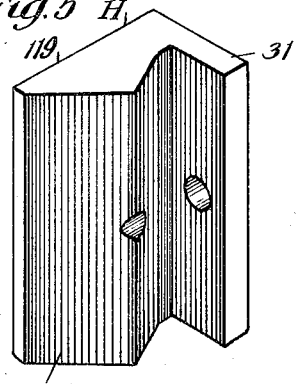
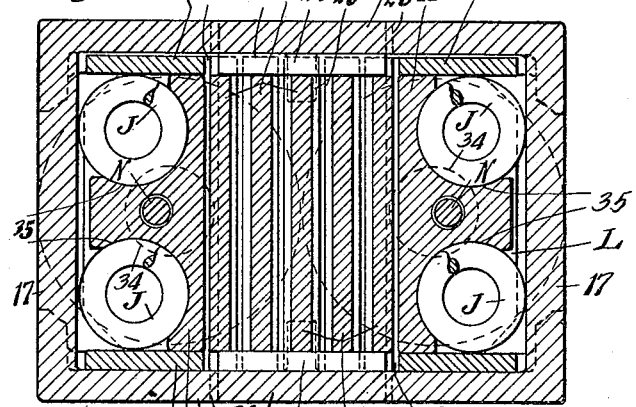
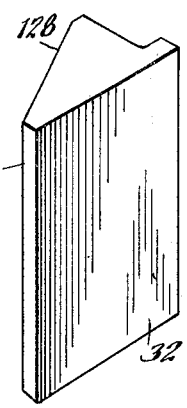
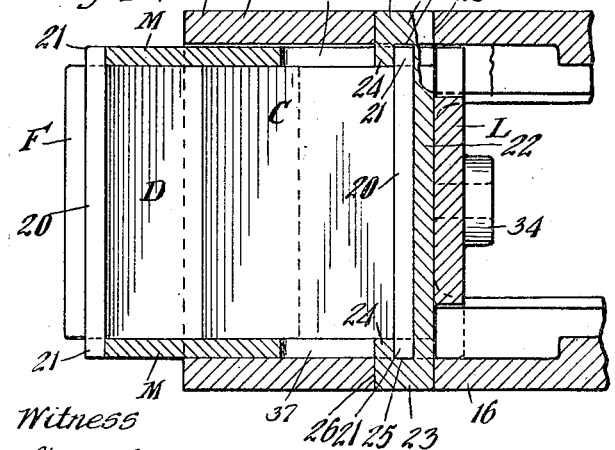
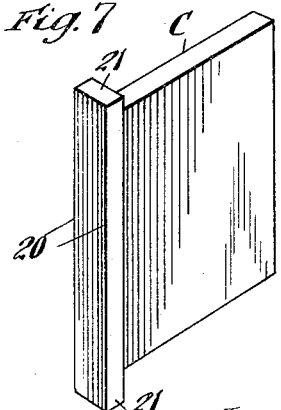
Inventor
John F. O'Connor Patented Feb. 28, 1928.

1,660,572

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed May 2, 1925. Serial No. 27,380.

This invention relates to friction shock absorbing mechanisms.

One object of the invention is to provide a shock absorbing mechanism having graduated preliminary action, followed by heavier final resistance.

Another object of the invention is to provide a shock absorbing mechanism of high capacity, especially adapted for railway draft riggings, wherein a graduated action is obtained, the resistance offered during the compression stroke increasing progressively.

A still further object of the invention is to provide a mechanism of the character indicated, having graduated initial frictional resistance, followed by final relatively heavy frictional resistance produced by relative movement of a plurality of friction plates.

Still another object of the invention is to provide a friction shock absorbing mechanism having graduated preliminary combined spring and frictional resistance and heavier final resistance, wherein a relatively heavy wedging action is had and release of the mechanism is assured by a lateral wedging pressure creating means comprising elements having coacting keen wedging faces and coacting blunt wedge faces.

A more specific object of the invention is to provide a shock absorbing mechanism including a friction casing; a plurality of relatively movable intercalated friction plates, certain of which are anchored to the casing, together with combined lateral pressure creating means frictionally cooperating with certain of the plates and the friction shell; and relatively light and heavy spring resistance elements, wherein graduated light preliminary action is had, during which relative movement of the pressure creating means and plates is resisted successively by the light and heavy spring resistance elements, the preliminary action being followed by a heavy frictional resistance during which the friction plates move relatively to each other.

Other objects and advantages of the invention will more clearly and fully appear from the description and claims hereinafter following.

In the drawings forming a part of this specification, Figure 1 is a longitudinal, horizontal, sectional view of a portion of a railway draft rigging, showing my improvements in connection therewith. Figure 2 is a front end, elevational view of the shock absorbing mechanism proper. Figure 3 is a transverse vertical sectional view corresponding substantially to the line 3—3 of Figure 1. Figure 4 is a longitudinal, vertical, sectional view of the front end of the mechanism illustrated in Figure 1 corresponding substantially to the line 4—4 of Fig. 1. And Figures 5, 6 and 7 are detailed, perspective views respectively of a blunt angled wedge friction shoe, a keen angled wedge friction shoe and one of the friction plates employed in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the drawbar is indicated at 13, to which is operatively connected a hooded yoke 14 of well known form. The shock absorbing mechanism proper, hereinafter more fully described, as well as a main follower 15 are disposed within the yoke. The yoke and the parts therewithin are supported in operative position by a detachable saddle plate 116.

My improved friction shock absorbing mechanism comprises, broadly, a combined spring cage and friction shell casting A; twin arranged main spring resistance elements B—B; a set of relatively fixed friction plates C—C; a set of relatively movable friction plates D—D; an anchoring element or plate E; two wedge blocks F—F; two keen angled friction shoes G—G; two blunt angled friction shoes H—H; four auxiliary spring resistance elements J—J; two pressure transmitting blocks K—K; a main spring follower L; two movable combined wear plates M—M, which function as plate restoring elements; and two retainer bolts N—N. The combined spring cage and friction shell casting is of generally rectangular outline, having spaced horizontally disposed top and bottom walls 16—16, vertically disposed side walls 17—17, and a transverse vertical end wall 18 adapted to cooperate with the stop lugs 12 in the manner of the usual rear follower. The side walls of the casting A are left open, as most clearly shown in Figures 1, 3 and 4, to permit shifting of the outer coils in assembly, the follower and twin arranged main spring resistance element B being inserted from front end of the friction shell section. The forward end of the casting A provides a friction shell, the side walls having opposed, interior friction surfaces 19—19 converging inwardly of the mechanism.

The friction plates C and D are arranged in a centrally disposed group at the forward end of the casting A, the plates D which are movable being alternated with the plates C which are fixed to the casting A as hereinafter more fully described. The group of friction plates comprises preferably four movable plates and five fixed plates, two of the fixed plates being arranged outermost and cooperating with twin arranged lateral pressure creating means hereinafter more fully described. The friction plates C and D are all of identical construction, except as hereinafter pointed out. Each plate C and D, as most clearly shown in Figure 7, is preferably formed of hard steel and is substantially rectangular in shape. As most clearly shown in Figure 7, the plate C is of substantially T-shape in horizontal section, being provided with lateral flanges 20—20 at the rear end thereof. The section forming the flanges 20 projects above the top and bottom edges of the plates, thereby providing lugs 21 for a purpose hereinafter described. All of the plates C and D with the exception of the two outermost plates C and D at each side of the group have the flanges 20 extending on both sides thereof, the latter plates having the flanges cut away at the outer side as shown most clearly in Figure 1, thereby presenting continuous friction surfaces for the entire length of the plates.

The plates C are anchored to the casting A by an anchoring element E. The anchoring element E comprises a transversely disposed, vertical, heavy plate-like section 22 having horizontally disposed right angled projections 23—23 at the top and bottom thereof, the latter being provided with transversely extending vertically disposed ribs 24, thereby presenting transverse slots 25—25 at the top and bottom of the retaining member adapted to accommodate the corresponding lugs 21—21 of the plates C. It will be evident that when the lugs 21 of the plates C are engaged within the slots 25, they will be held in fixed relation to the casting A, being restrained from outward movement by the ribs 24. The top and bottom walls 16—16 of the casting A are provided with vertically alined transversely disposed, elongated openings 26—26 adapted to accommodate the top and bottom sections 25 of the anchoring element.

The wedge blocks F are arranged in pairs at opposite sides of the mechanism. Each wedge block F, as shown, is in the form of a casting which is suitably cored and has a flat front face 27 adapted to bear on the inner face of the main follower 15. At the inner end, each block is provided with two rearwardly converging wedge faces 28 and 29, the wedge face 28 being disposed at a relatively keen angle with reference to the longitudinal axis of the mechanism while the face 29 is disposed at a relatively blunt angle with reference to said axis.

Friction shoes G and H are arranged in pairs at opposite sides of the group of friction plates, each pair cooperating with one of the wedge blocks F. Each shoe H has a longitudinally disposed friction surface 119 adapted to cooperate with the corresponding friction surface 19 of the friction shell. On the inner side, each shoe H is provided with a lateral enlargement 30 having a wedge face 129 at the forward end thereof, correspondingly inclined to and adapted to cooperate with the face 29 of the corresponding wedge block F. Rearwardly of the wedge face 129 the enlargement of the shoe H is cut away to accommodate the rear portion of the cooperating wedge shoe G. At its rear end, each wedge shoe H has a lateral extension 31 adapted to form an abutment for the rear end of the co-operating shoe G and also an abutment surface for the front end of the cooperating auxiliary spring resistance elements J—J.

The two wedge shoes G are also of like construction, each shoe having a wedge face 128 at the outer end thereof, correspondingly inclined to and adapted to cooperate with the wedge face 28 of the corresponding wedge block M. As most clearly shown in Figures 1 and 6, the rear end of each wedge friction shoe G is cut away to accommodate the lateral projection 31 of the corresponding shoe H. Each of the shoes G is also provided with a longitudinally disposed friction surface 32 at the inner side thereof adapted to cooperate with the corresponding outermost fixed friction plate C of the group.

The spring follower L is in the form of a relatively heavy, substantially rectangular plate having its front face normally bearing on the rear face of the vertical section 22 of the anchoring element E.

The main spring resistance elements B—B preferably comprise twin arranged members, each member consisting of a relatively heavy outer coil and a relatively lighter inner coil, the inner coil of each member being held in centered position by lugs 33 and 34, projecting respectively from the rear wall 18 of the casting A and the rear side of the spring follower plate L.

The auxiliary spring resistance elements J are preferably four in number, being arranged in pairs at opposite sides of the mechanism. Each pair of coils J is interposed between the main spring follower L and the inner end of the corresponding friction wedge shoe H.

The pressure transmitting blocks K are of similar design, one of the same being disposed at each side of the centrally arranged group of friction plates. The blocks K are interposed between the spring follower L and the inner ends of the friction shoes, the rear end of the block normally bearing on the spring follower L and the front end of the same being slightly spaced from the inner end of the corresponding friction shoe H, as most clearly illustrated in Figure 1. Each block is provided with a pair of recesses 35—35 adapted to accommodate the corresponding auxiliary spring elements J.

The two wear plates M are disposed respectively above and below the friction plates and wedge pressure creating systems and are adapted to slide on the inner surfaces of the top and bottom walls of the casting A. Each of the plates M is centrally cut away at the forward end, as indicated at 36, to accommodate the top and bottom lugs 21 of the movable friction plates D. At the rear end, the central portion of each plate M is also cut away, as indicated at 37, to provide clearance for the anchoring element when the mechanism is fully compressed. As most clearly illustrated in Figures 1 and 4, the wear plates M normally bear at their rear ends on the spring follower L and at their forward ends engage the lugs 21 of the movable plates D.

The mechanism is held under initial compression and maintained of uniform overall length by the two retainer bolts N, one of the bolts being disposed at each side of the mechanism. Each of the bolts N is anchored respectively to the casting A and the wedge block F at the corresponding side of the mechanism, the head of the bolt being accommodated in an opening in the corresponding boss 33 on the rear wall 18 of the casting A and the head of the bolt working in the cored opening of the corresponding wedge block F. The wedge friction shoes G and H, the pressure transmitting blocks K and the spring follower L are recessed to freely accommodate the shanks of the bolts, sufficient clearance being provided for the necessary lateral movement of the wedge friction shoes H.

The parts are so proportioned and arranged that the outer ends of the movable friction plates D are normally spaced a predetermined distance from the inner face of the follower 15 to provide for preliminary action of the mechanism, before any relative movement of the friction plates is had. In this connection it is pointed out that the space left between the outer ends of the plates D and the main follower 15 is appreciably greater than the clearance between the inner ends of the friction wedge shoes H and the pressure transmitting blocks K.

In assembling the mechanism, the twin arranged main springs B are first assembled with the spring cage, one of the large coils thereof being first entered into the spring cage through the front end of the friction shell. This coil is then laterally shifted to permit insertion of the other large coil in a similar manner, the opening in the corresponding side wall of the shell permitting the necessary lateral shifting of the first named coil. After the two large coils have been placed in position, the two small coils are telescoped therewithin. The main spring follower is then inserted through the front end of the friction shell. The anchoring element E is then placed in position. The anchoring element forms an abutment for the spring follower limiting its outward movement thereby maintaining the twin springs B under initial compression. The stationary friction plates are next assembled with the mechanism by passing them into the casting from the forward end on either side of the anchoring element and bringing the lugs 21 thereof in alinement with the recesses 25. The plates are then slid laterally to dispose the lugs 21 in the top and bottom recesses 25 of the anchoring element E with the rear end of each plate abutting the vertical section 22 of the anchoring element and the front face of the lugs 21 engaging the ribs 24 thereof. The pressure transmitting blocks K, auxiliary spring resistance elements J, the wedge systems comprising wedge friction shoes G and H, the wedge blocks F, and the two wear plates M are then placed in position and the movable plates D intercalated with the stationary friction plates C. The bolts N are then anchored to the casting A and the wedge blocks F and the nuts of the bolts are so adjusted as to place the auxiliary springs J under initial compression.

The operation of my improved shock absorbing mechanism, assuming a compression stroke, is as follows: The follower 15 and the casting A are moved relatively toward each other, forcing the wedge blocks F inwardly of the mechanism, pressing the friction shoes into tight frictional engagement with the friction surfaces of the shell of the casting A and the central group of intercalated friction plates and also carrying the shoes rearwardly of the casting A relatively to the fixed plates of said group. The preliminary springs J will thus be compressed against the spring follower L, which, during this initial action, is held substantially stationary by the springs B which are of greater capacity than the springs J. It will be evident that there will be substantially no wedging action between the blunt faces of the wedges and the corresponding shoes H, while a true wedging action will be effected between the cooperating keen faces of the wedges F and the shoes G. Due to the wedging action, there will be a slight expansion of the shell, thereby storing up energy therein, whereby the shell will forcibly contract when the actuating pressure is removed, creating lateral inward pressure on the blunt faced shoes H and H and facilitating release of the main wedges due to the releasing angle of the cooperating wedge faces of the main wedges and the shoes H. As the operation of the mechanism continues, compression of the auxiliary springs J will be limited by the rear ends of the friction shoes H coming into engagement with the pressure transmitting blocks K, whereupon the follower L will be carried rearwardly in unison with the friction wedge systems compressing the main spring resistance elements B. During the described action, friction will be created between the friction shoes H and G of each wedge system and the friction surfaces of the shell and outermost fixed plates. Due to the converging relation of the friction surfaces of the shell, the blunt angled shoes will be compelled to move laterally inwardly, slipping on the faces 129 of the wedges F and effecting an inward movement of the shoes H with reference to the shoes G and an additional compression of the auxiliary and main spring resistance elements. From the preceding description, taken in connection with the drawings, it will be evident that two stages of preliminary action are provided for, the auxiliary springs J being compressed during the first stage and the main spring resistance elements B being compressed during the second stage. During the further compression of the mechanism, the inwardly moving follower 15 will engage the outer ends of the friction plates D and carry the same inwardly with reference to the fixed friction plates C, thereby greatly augmenting the friction resistance offered during the remainder of the compression stroke. This action will continue until the actuating force is reduced or until the follower 15 engages the outer end of the casting A, whereupon the compression of the springs B will be limited and the force transmitted directly through the casting A to the stop lugs of the draft sills. In this connection, attention is called to the fact that as the mechanism is compressed during the second stage of the preliminary action, the spring follower L will be moved out of engagement with the inner ends of the top and bottom wear plates M and that this spaced relation will be maintained during the remainder of the compression stroke while the plates M are being carried rearwardly in unison with the movable friction plates D. This action is of importance as it provides for release of the friction wedge system by the main and auxiliary springs before the wear plates M are engaged by the follower and carried forwardly to restore the movable plates D to normal position.

Due to the employment of the blunt and keen sets of wedge faces, I am enabled to obtain a very high wedging action during the compression stroke, since the keen wedge faces may be made relatively acute, without danger of the parts sticking, the blunt wedge faces acting more or less as "safety valves." In this connection, it will be understood by those skilled in the art that my improvements are capable of use in a mechanism either employing a blunt and keen angle system of wedge faces, or wedge faces which are all of the same angle with respect to the axis of the mechanism. In release, the springs B and J effectually restore all of the parts to normal position.

From the preceding description taken in connection with the drawings, it will be evident that I have provided a gear having a plurality of stages of successively increasing resistance, two stages of successively increasing preliminary frictional resistance and a third stage of relatively heavier final frictional resistance. This gear is particularly adapted for passenger car service, as abrupt and sudden shocks are entirely eliminated due to the blending of the different stages of the compression stroke of the mechanism.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a column-load-sustaining member; of a plurality of alternated, relatively movable and stationary friction elements mounted on said member, said stationary elements being fixed against longitudinal movement with respect to the column load sustaining member; a follower, said member and follower being movable relatively toward and from each other; a combined restoring and cushioning spring resistance; lateral pressure creating means disposed and operating on the outer sides of said elements and arranged to exert opposite and inward lateral pressure on said elements upon relative approach of said follower and member; and an auxiliary spring resistance cooperating with said lateral pressure creating means.

2. In a friction shock absorbing mechanism, the combination with a friction shell having interior friction surfaces; of a plurality of intercalated friction plates arranged in a centrally disposed group, certain of said plates being anchored to the shell; a wedge system interposed between said group of plates and each friction surface of the shell, said wedge system including a wedge pressure transmitting member and a pair of friction wedge shoes, said shoes having longitudinally disposed friction surfaces co-operating with the outermost plates of said group; and successively operative preliminary and main spring resistance elements co-operating with said shoes.

3. In a friction shock absorbing mechanism, the combination with a friction shell having interior, inwardly converging friction surfaces; of a group of intercalated friction plates arranged centrally within the friction shell; certain of said plates being anchored to the shell; a pair of wedge systems, disposed at opposite sides of the group of friction plates and co-operating with the friction surfaces of the shell, each wedge system including a wedge pressure transmitting member and a pair of friction wedge shoes, certain of said shoes co-operating with the outermost plates of the group and successively operative preliminary and main spring resistance elements co-operating with said pairs of shoes.

4. In a friction shock absorbing mechanism, the combination with a friction shell having interior friction surfaces; of a central group of intercalated friction plates, certain of said plates being anchored to the shell and the remainder of the plates being movable relatively thereto; a wedge system at each side of the group of plates and co-operating with one of the friction surfaces of the shell; a main spring resistance; and means for restoring the movable plates to normal position, comprising wear plates interposed between said group of plates and the corresponding top and bottom walls of the shell, said wear plates being actuated by said main spring during release of the mechanism.

5. In a railway draft gear, the combination with front and rear limiting stops; of a combined spring cage and friction shell co-operable with certain of said stops; a main follower co-operating with the remaining stops; a centrally arranged group of intercalated, relatively movable friction plates, certain of said plates being stationary with reference to said combined spring cage and friction shell; lateral pressure creating means co-operating with said main follower for compressing said plates, said means including a pair of friction elements co-operating with the friction plates; a preliminary spring initially resisting inward movement of said elements; a main spring adapted to be compressed by the movement of said elements after a predetermined compression of the preliminary spring.

6. In a friction shock absorbing mechanism, the combination with a friction shell having interior friction surfaces converging inwardly of the mechanism; of a central group of intercalated friction plates, certain of said plates being anchored to the shell; a wedge system co-operating with each friction surface of the shell and the outermost plates of the group at the corresponding sides of the mechanism, each wedge system including a wedge pressure transmitting member and a pair of friction wedge shoes, said shoes having longitudinally disposed friction surfaces co-operating with the outermost plates of said group; a main spring resistance; a spring follower co-operating with the main spring resistance; a preliminary spring resistance interposed between the spring follower and the friction shoes; and limiting stop blocks also interposed between the friction shoes and the spring follower.

7. In a friction shock absorbing mechanism, the combination with a friction shell having interior, inwardly converging friction surfaces; of a central group of intercalated friction plates, certain of said plates being anchored to the shell; a wedge system at each side of the mechanism interposed between the central group of plates and the corresponding friction surface of the shell, said wedge system including a wedge pressure transmitting member having wedge faces disposed respectively at blunt and keen angles with reference to the longitudinal axis of the mechanism; and two pairs of friction wedge shoes, certain of said shoes having wedge faces co-operating with blunt faces of said wedges and the remaining shoes having faces co-operating with the keen faces of the wedges, certain of said shoes also having longitudinally disposed friction surfaces co-operating with the outermost plates of said group; and successively operative preliminary and main spring resistance elements co-operating with said shoes.

8. In a friction shock absorbing mechanism, the combination with a combined friction shell and spring cage; of friction shoes; wedge means co-operating with the shoes; relatively movable intercalated friction plates within the shell, twin arranged spring resistance elements within the shell, said shell being open at one end to permit entrance therethrough of the spring resistance elements into the spring cage, said cage having the opposite side walls thereof cut away to permit lateral displacement of the individual members of the spring resistance elements when assembling the mechanism; and detachable stop means for retaining the spring within the spring cage.

9. In a friction shock absorbing mechanism, the combination with a combined friction shell and spring cage; of a friction means co-operating with the friction shell; twin arranged main springs; a spring follower interposed between the friction means and springs, said spring follower and springs being insertable through the friction shell into the spring cage, and said cage having openings at the opposite sides thereof of less width than the outer diameter of the individual units of the twin spring resistance elements to thereby facilitate assembly of the springs within the cage; and detachable abutment means fixed to the shell and engaging the spring follower for limiting outward movement of the spring follower and retaining the main springs within the spring cage.

In witness that I claim the foregoing I have hereunto subscribed my name this 28th day of April 1925.

JOHN F. O'CONNOR.